D. J. RYAN.
PROCESS OF PREPARING SAND MOLDS FOR AND CASTING CUP SHAPED ARTICLES.
APPLICATION FILED MAY 7, 1915.
1,255,468.
Patented Feb. 5, 1918.
5 SHEETS—SHEET 1.
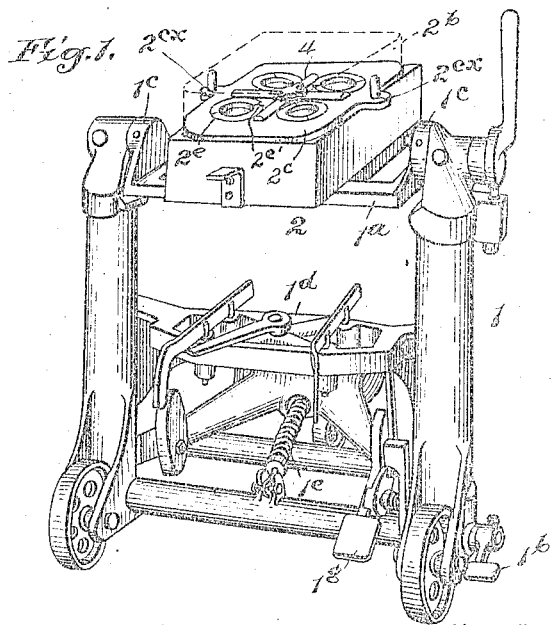
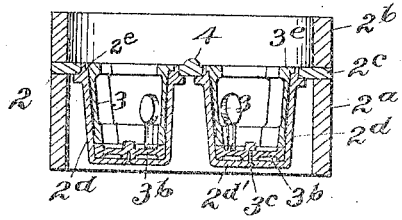
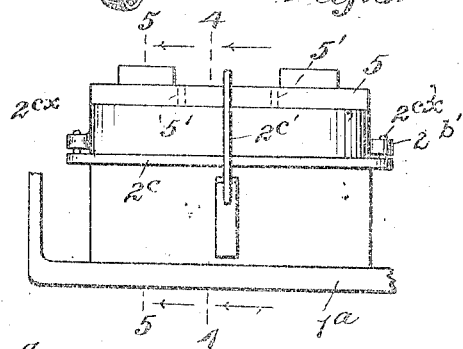
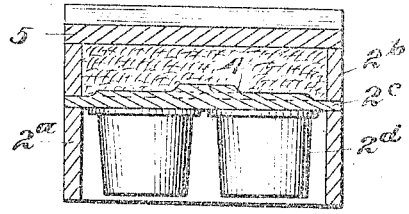
Witnesses
S. W. Brainard
W. H. Percy
Inventor
Daniel J. Ryan
By ................
Attorney

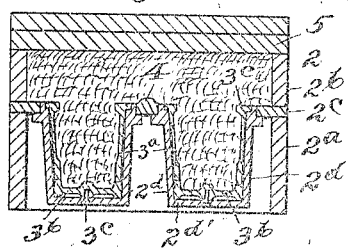
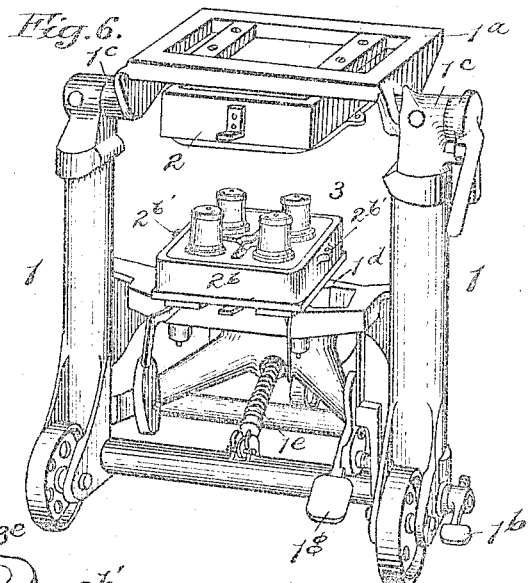
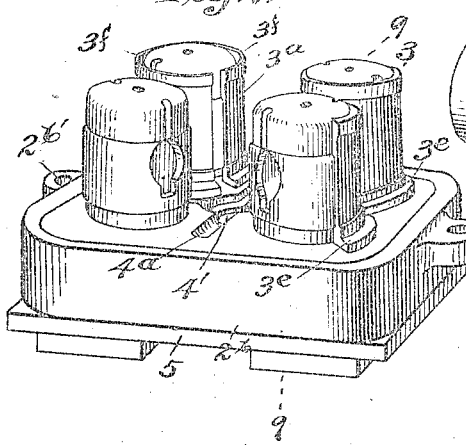
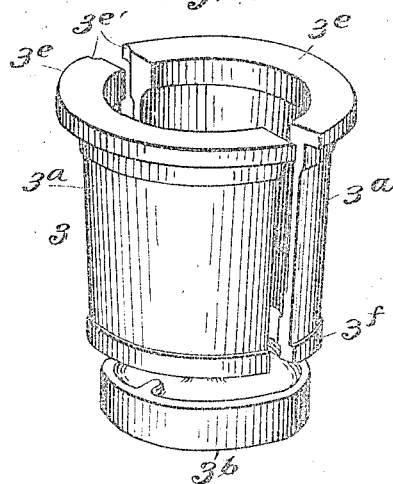
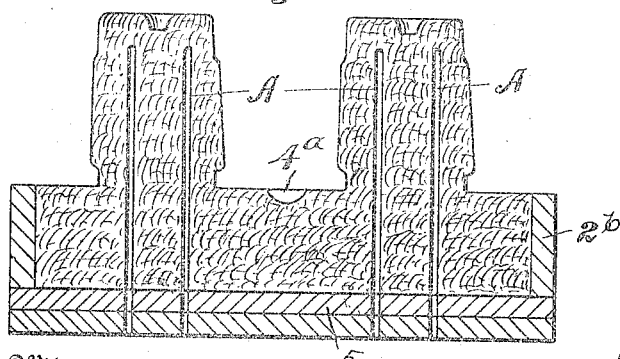

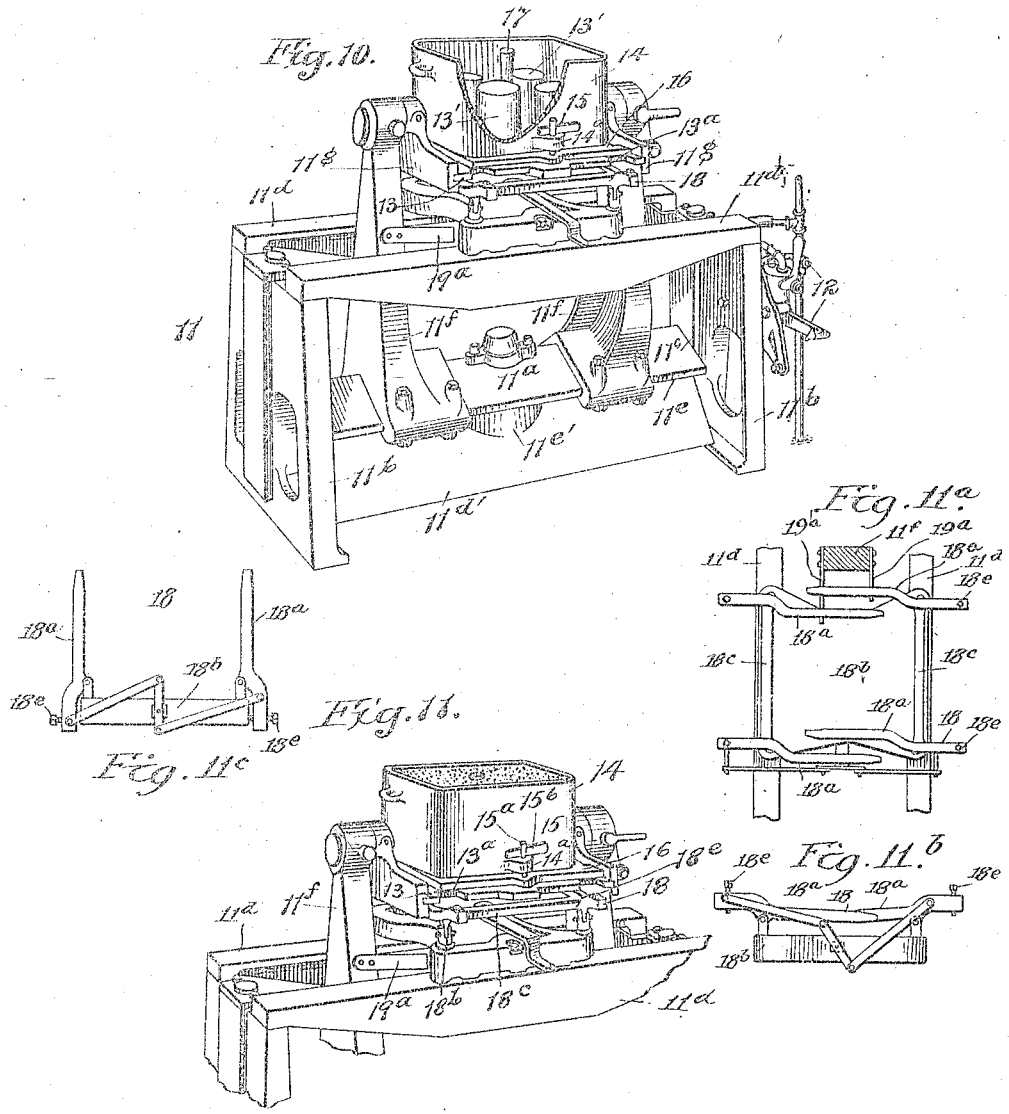

D. J. RYAN.
PROCESS OF PREPARING SAND MOLDS FOR AND CASTING CUP SHAPED ARTICLES.
APPLICATION FILED MAY 7, 1915.
1,255,468.
Patented Feb. 5, 1918.
5 SHEETS—SHEET 4.
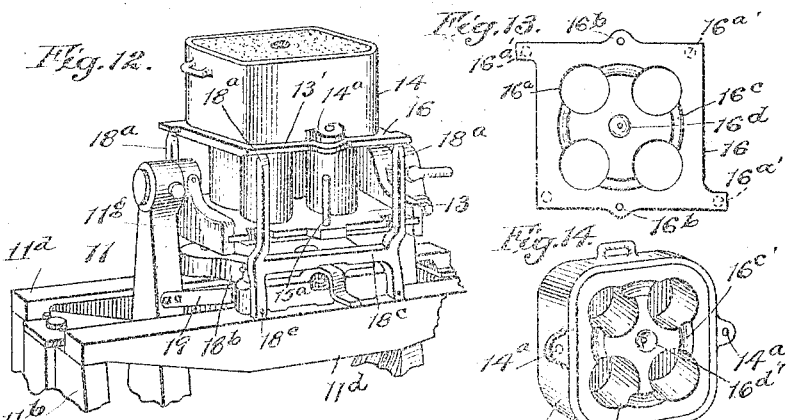
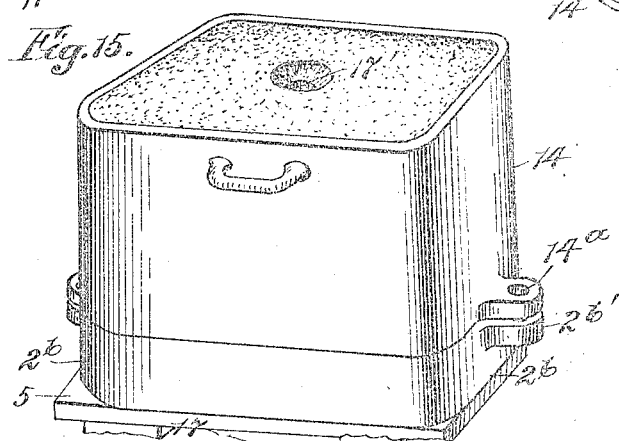
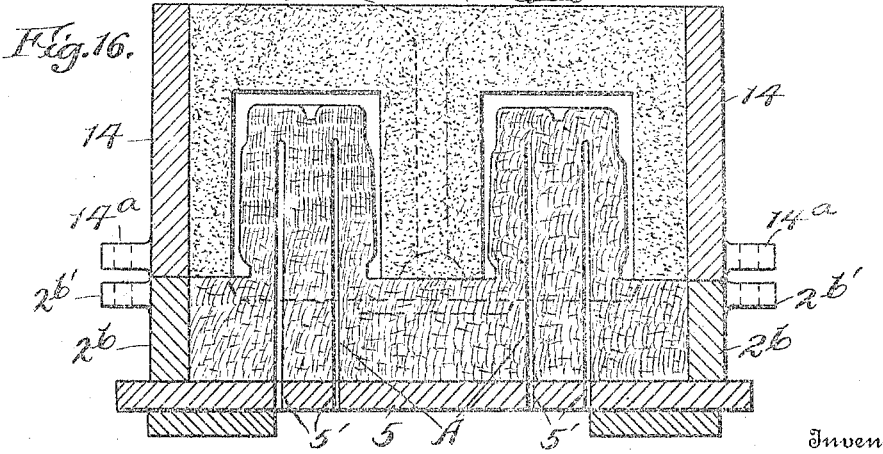
Witnesses
S. W. Brainard.
W. H. Percy.
Inventor
Daniel J. Ryan
By Edward R. Alexander
Attorney

UNITED STATES PATENT OFFICE.

DANIEL J. RYAN, OF CLEVELAND, OHIO.

PROCESS OF PREPARING SAND MOLDS FOR AND CASTING CUP-SHAPED ARTICLES.

1,255,468.

Specification of Letters Patent.

Patented Feb. 5, 1918.

Application filed May 7, 1915. Serial No. 26,454.

*To all whom it may concern:*

Be it known that I, DANIEL J. RYAN, a citizen of the United States, residing at Cleveland, in the county of Cuyahoga and State of Ohio, have invented certain new and useful Improvements in and Relating to Processes of Preparing Sand Molds for and Casting Cup-Shaped Articles, of which the following is a specification.

This invention relates to a process of preparing sand molds for the casting of cup-shaped articles, such, for example, as motor pistons, and to the casting thereof.

One object of the invention is to simplify the process or art of making molds for casting motor pistons and similarly shaped articles.

Another object of the invention is to provide an improved process of preparing molds for casting a series of pistons simultaneously, whereby the labor and operating expenses are greatly reduced.

Another object of the invention is to make the cores and their supports of an integral mass of material, such as sand.

A further object is to have the walls of each mold of the same material similarly prepared and conditioned, so that the metal in the casting engages on both sides walls of similar material similarly conditioned.

Another object of the invention is to provide an improved process of preparing molds for casting a series of cup-shaped articles with side walls of substantially uniform cross-sectional area where desired.

A further object of the invention is to provide molds with properly alined concentric green sand cores all of which are supported in fixed relationship and coöperate with the mold cavities to cast cup-shaped articles with walls of uniform thickness and which may be comparatively thin where desired.

Another object of the invention is to facilitate the pouring of the casting and insure that the casting will be formed quickly, substantially homogeneous throughout and without blow-holes.

With these and other objects in view, the invention consists of the steps combined and set forth in the appended claims, all of which will be clearly understood from the following description:

In carrying out my invention, first, I assemble the mold or molds for forming preferably simultaneously a plurality of cores of an integral mass of green sand. For this purpose I prefer to use a frame or support suitably mounted, preferably on trunnions, whereby it may be inverted for a purpose to be later herein set forth. Within this frame I next suitably support a plurality of readily removable core boxes, each such box comprising a plurality of sets of segmental shaped sections which closely engage each other edge to edge when assembled and at one end closely engage a suitable end closure. Each such engaging edge may be suitably ground or otherwise surfaced for intimate contact with the adjacent wall which it may engage.

Next, the drag part of the flask is mounted upon the frame in any suitable manner. I prefer to have the outer end edges of the segmental core box sections lie flush with or substantially in the plane of engagement of the edges of the drag with the coöperating edges of the frame supporting said core box sections.

The inner walls of the core box sections may be of any desired shape longitudinally and circumferentially, depending upon the desired contour of the article to be cast.

As the drag is supported on the top of the frame, it surrounds the upper open ends of the core boxes so that the green sand placed in the core box sections and the drag becomes one integral mass.

The cores may be grouped in the frame in any desired arrangement. I prefer, however, to group them around a common axis and to form a pouring basin common to all the cores with sections of gates leading from the pouring basin to points adjacent the cores.

In order to do this I suitably support on the said frame a pattern which will cause to be formed in the sand a pouring basin with sections of gates leading therefrom between the core box sections. This arrangement is particularly advantageous as but one sprue opening to the pouring basin is required, which may be an equal distance from each of the molds. Furthermore, by providing the pouring basin and gates as just described, they will be disposed at the lower end of the entire mold when the parts of the flask are finally assembled, so that in pouring the molten metal into the mold it is first directed to the lowermost point thereof from which it rises into each mold section, forcing the air and gases out through the sand and suitable vents.

Next, I form the cores, the pouring basin common thereto and the sections of gates leading from the basin to a point adjacent each core. For this purpose, the core boxes and drag are filled with a quantity of previously prepared green sand which is immediately tamped in any suitable way. The green sand should be tempered to the proper degree and condition, as operating conditions may require. Where the aforesaid frame is mounted upon a rising and falling trunnion support, the sand may be tamped in any suitable manner, as by a jolting operation, such as is well known to those skilled in this art. Thereafter, the excess sand on top of the drag is leveled with a suitable tool and a board or plate is detachably secured to the drag by a bail or other device which engages the frame and secures the drag, board and frame together. Prior to fastening such board or plate to the drag, I prefer to suitably vent the cores. This may be done in any well known manner, as by having vent pins secured to a suitable support and pressing such pins into the cores through openings in the said board or plate and then removing said vent pins so as to leave the vent holes open at one end.

The next step consists in separating the drag, cores and core boxes from the frame. In carrying out this step I cause relative movement to take place between the drag, cores and core boxes, and the frame in a direction axially of each core. This operation or step may be effected by gravity. The frame is first inverted on its trunnions and then the bail is detached from the frame, whereupon the drag with the cores and core box sections may move downwardly. For convenience in supporting and controlling the drag, cores and core box sections during their downward movement, I preferably provide a rising and falling carrier below the frame. This carrier is, by suitable mechanism, moved upwardly into a position to engage with and support the drag, the sand therein, cores and the core boxes. Upon the detachment of the connections between the board or plate and the frame, downward movement of the carrier is effected, it being properly controlled and brought to a state of rest at its lowest position, without injury to the cores, by means of its operating mechanism, the drag, cores and core box sections separating from the support under the influence of gravity. The carrier is guided downwardly so as to cause each core and core box to move as a unit in an axial direction sufficiently far to entirely separate them from the frame. It is essential that the core box sections for each core move therewith as a unit during the separation of the core from the frame, otherwise if one or more of them should, due to friction or other cause, stick to the support, injury might result to the core. Especially is this true where the cup-shaped article to be cast is provided with internally projecting members.

I prefer that the core box receiving walls of the frame shall be slightly inclined and that the bearing walls on the segmental sections shall be arranged to coöperate therewith so that the separation of said sections will be easily effected.

Next, I remove the core box sections from the cores. Prior to this step of my process I may move the drag and the formed cores therein from the carrier to some table or other support where the core box sections are readily accessible, as for example to a vibrating table or support. The segmental sections constituting each core box are moved radially outward away from the core to separate them therefrom. An operative may perform this step by hand, two sections of each box being grasped and preferably moved substantially simultaneously radially away from the adjacent core. Where more than one operative is provided, the sections of a plurality of core boxes may be removed substantially simultaneously. This operation is continued until all of the boxes are separated from the cores.

Each set of core box sections may be so disposed that the operative may utilize to the best advantage the spaces between the cores for grasping the core box sections and moving them away from the cores.

Next, I form the mold section, which receives the cores. At the same time I preferably form the sprue opening for the mold and the gates which directly communicate with the mold cavities. In carrying out this step of my process, I place a cope on top of a pattern or patterns. The pattern is shaped to form the desired number of mold cavities corresponding to the number of cores on the drag, also, preferably, a top wall for the pouring basin, the other part of which is formed in the drag, and gate sections which register with the outer ends of the gate sections formed in the drag and extend laterally from the mold cavities at either side thereof so as to direct the molten metal thereto. A sprue pin is then properly positioned on the pattern so as to form a sprue hole, the lower part of which will be at the center of the said pouring basin between the cores in the drag. Then the cope is filled with green sand preferably of the same quality and character and in the same condition as that used in the drag. The sand is tamped in any suitable manner, as by jolting the cope, and suitable venting, if desired, may be done in any well known manner. I then strip the mold from the pattern in any suitable manner.

Finally, I place the cope on the drag and thereby assemble the cores within the mold cavities to complete the mold with the gate sections, the sprue and pouring basin in coöperative relationship to receive and conduct the molten metal to the molds formed by the cores and mold cavities. This operation may be performed by hand, or by suitable elevating and transporting mechanism. The drag and cope are provided with alining devices of a well known character to facilitate proper alinement, as shown in Figs. 15 and 16. The mold cavities and cores are so arranged that when they are assembled each core will be concentric to the walls of the adjacent mold cavity, so as to insure a cup-shaped casting with walls of uniform thickness where desired.

The metal is then poured into the sprue opening in the cope. It descends through the sprue hole to the centrally disposed pouring basin and thence radially in the gate sections in the drag on opposite sides of each core to the gate sections in the cope and thence laterally to the mold cavities, at opposite sides thereof, rising in the latter to form the casting, the air and gases in the mold cavities and sand being ejected through the sand and the suitably disposed vents.

Where a plurality of cup-shaped molds are made simultaneously, great care is required to assemble and maintain each core concentric with its respective mold cavity. In carrying out my process I am enabled to maintain the cores in fixed relation to each other while being assembled in the mold cavities and each in concentricity with its respective mold cavity during pouring of the metal. These advantageous results are attained essentially by making all the cores of an integral mass of sand. The sand in the cores and the drag is tamped into one integral mass, the binding characteristics of which prevent any displacement of the cores in the mold cavities, or relatively to each other, and insure that the walls of the castings will be of uniform thickness or cross-sectional area at all points circumferentially, where desired.

My process provides for the formation of a common pouring basin in the drag and of the sprue in the cope, so that in casting the pistons or other cup-shaped articles the metal is conducted to the lowest part of the flask from whence it flows to and rises in each of the piston molds. This arrangement permits the pouring operation to be properly carried out to produce perfect castings, as it overcomes to a large extent, if not entirely, the formation of air or gas holes in the molds and any damage to the sides of the cores due to the force of the molten metal during pouring thereof and escaping gases.

My process also provides for the formation of cup-shaped articles each having walls relatively thin and of uniform thickness where desired. This is effected by forming the cores and the sand in the drag of one integral mass, so that the cores will have a fixed and definite relationship with each other and the mold cavities when inserted therein.

The value for example, of lightening the weight of pistons, which are a part of the reciprocating members of an internal combustion motor, is well known. With my improved process I am enabled to cast with great efficiency and economy pistons having comparatively thin walls and insure that such walls will be of substantially uniform cross-sectional area, except, of course, where internal projecting members are disposed.

In my improved process the cast metal engages at both sides of the casting with material of substantially the same character, quality and condition. The cores are so formed that they practically cannot get out of proper position. It will be understood that my process greatly reduces the cost of making cup-shaped molds where cores of dry sand or other materials are employed, which have to be made, dried or hardened in any suitable manner and then positioned upon a support and there held. The proper positioning of such dry sand cores in itself is a most delicate matter and there is absolutely no assurance of obtaining in such a manner cylindrical walls of uniform cross-sectional area at all points about the circumference where desired.

In view of the fact that in my improved process the core box sections are separated by radial movement relative to the axis of the inclosed core, such sections may be readily constructed so as to cause to be formed in the core depressions or recesses which will provide on the cup-shaped casting internally projecting integral bosses, pin supports, ribs, fins or webs. In making engine pistons, this is of peculiar advantage, since it is often desirable to have such bosses or pin supports for supporting the wrist pins, and internal ribs, fins or webs for heat radiating or strengthening purposes, either or both. The radial separation of the core box sections is especially advantageous in this connection.

It will be noted that with my invention it is possible to use green sand in the making of cores and to insure that the cores will be properly positioned in the cope of a flask without any particular skill being required on the part of the molder or operative to secure this highly advantageous result. Thus the labor, equipment, time and expense of making dry sand cores or the like and later positioning them in the flask is obviated, while on the other hand the green sand can be used over and over for making new cores.

My invention provides for rigidity of the cores relative to the drag and each other when incased in the flask and during the pouring operation, and insures a casting having uniform walls throughout its entire circumference on any desired radial plane.

Furthermore, by using green sand for making the cores, both parts of the mold may be made from the same material, to avoid unequal setting or chilling of the molten metal. I am enabled therefore to produce a casting with annular sections, the metal in the walls of which has the same quality and characteristics on its inner and outer surfaces.

Having described the various steps for carrying out my invention, I will now describe one way of carrying out the steps of the process. Referring to the drawings—

Figure 1 is a perspective view of a machine on which the core or cores of the mold are made.

Fig. 2 is a sectional view of the core box frame and drag connected together ready to receive the sand.

Fig. 3 is a front view of the core box frame and drag secured together after the cores have been tamped.

Fig. 4 is a section on the line 4—4 of Fig. 3.

Fig. 5 is a section on the line 5—5 of Fig. 3.

Fig. 6 is a perspective view of the machine shown in Fig. 1, illustrating the removal of the cores and core boxes from the core box frame.

Fig. 7 is a perspective view of the drag and cores and illustrating the operation of removing the core box sections.

Fig. 8 is a perspective view of a complete core box, the parts thereof being enlarged and partly separated from each other.

Fig. 9 is a sectional view through the drag and cores on the line 9—9 of Fig. 7.

Fig. 10 is a perspective view of a machine on which a mold in the cope is formed, the cope being mounted on and secured to the pattern plate.

Fig. 11 is a fragmentary view, showing the cope tamped.

Figs. 11$^a$, 11$^b$ and 11$^c$ are fragmentary detail views of the mechanism which engages with the stripping plate for stripping the mold from the pattern plate.

Fig. 12 is a fragmentary view illustrating the operation of stripping the mold from the pattern plate.

Fig. 13 is a top plan view of the stripping plate.

Fig. 14 is an inverted perspective view of the cope with a mold formed therein.

Fig. 15 is a perspective view of the cope and drag secured together ready for pouring of the mold.

Fig. 16 is a longitudinal sectional view through the cope and drag.

Figure 17:
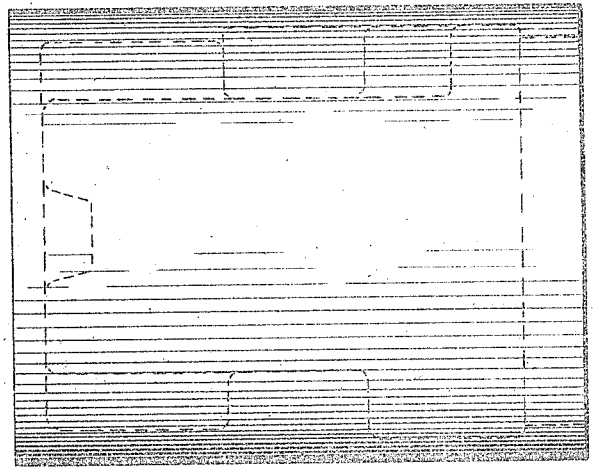

Fig. 17 is an elevation of a piston cast in the mold shown in Fig. 15.

Figure 18:
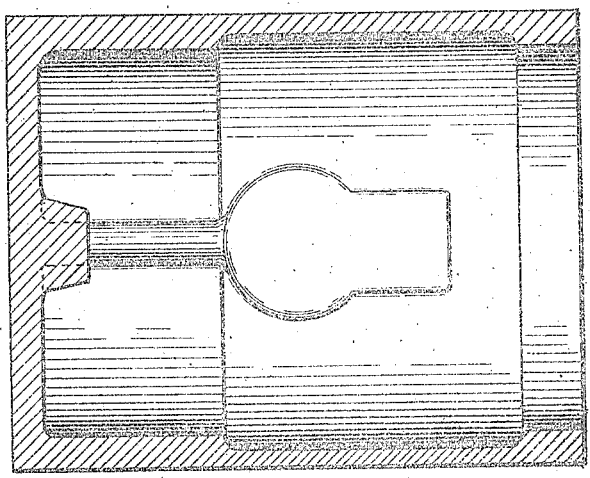

Fig. 18 is a sectional view of the piston.

Figure 19:
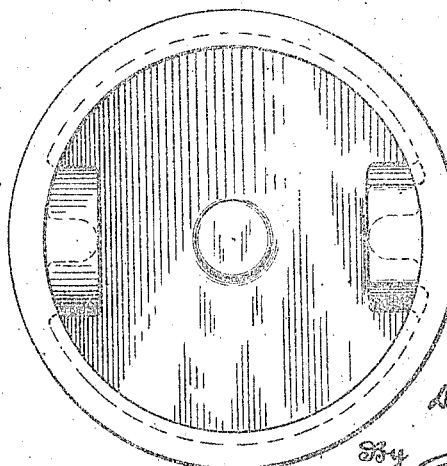

Fig. 19 is a plan view of the piston.

The assembling of the core boxes for forming simultaneously a plurality of cores of an integral mass of green sand is preferably carried out in connection with a machine.

1 indicates such a machine adapted to support during the making of a core or cores, a core box structure, indicated as an entirety at 2.

It is preferably provided with a bed $1^a$, which, under the control of a lever $1^b$ (or other suitable mechanism) may be jolted to properly tamp the sand, as will be later set forth. The bed $1^a$ may be mounted on trunnions $1^c$, whereby the core box structure can be inverted.

$1^d$ indicates a vertically movable carrier adapted to support the drag with the core or cores thereon, after they have been formed, and to lower them, whereby they will become disengaged from the core box frame or support. The carrier $1^d$ may be operated up and down by any suitable mechanism. The elevating and lowering mechanism preferably comprises a coil spring $1^e$, one end of which is connected to the frame of the machine 1 and its other end is connected to the lever mechanism for the carrier $1^d$. The spring $1^e$ is arranged to be placed under tension when the carrier $1^d$ is moved downwardly by the lever mechanism. The carrier $1^d$ may be actuated manually by means of a foot lever $1^g$. As a result of this construction, the spring $1^e$ operates to lift the carrier $1^d$ upon the release of a lock device which normally holds the carrier $1^d$ in its lowermost position.

It will be understood that the machine 1, referred to and illustrated herein, in itself, forms no part of my present invention, but that it simply serves as a suitable support for the core box structure 2 and lends itself to the convenient and rapid operation thereof during the making of the cores.

Next I suitably support a plurality of readily removable core boxes on the bed 1ª. For this purpose I use said core box structure 2 which includes a frame 2ª and one part 2ᵇ of a flask, preferably the drag thereof, adapted to be detachably fixed to the said frame 2ª by suitable devices 2ᵉˣ. The core box frame 2ª is arranged to be fixed to the bed 1ª of the machine 1 in any well known way; it may be detachably fixed thereto in order that it can be removed when desired. The core box frame 2ª comprises a plate 2ᶜ provided with one or more cup-shaped, core box receiving and supporting members 2ᵈ, the upper ends of which preferably lie flush with the surface of the plate 2ᶜ. The lower ends of the members 2ᵈ are preferably closed by plates 2ᵈ' which may be formed integral with the walls thereof. The walls of each support or member 2ᵈ are recessed, as shown at 2ᵉ, and provided with a stop 2ᵉ' for a purpose to be later set forth.

3 indicates the core boxes proper, each removably mounted in one of the cup-shaped members 2ᵈ. Each core box 3 preferably comprises two semi-cylindrical sections 3ª, 3ª, and a cap 3ᵇ, adapted to form a core of the desired size and shape when filled with sand and tamped in the manner hereinafter described. Each cap 3ᵇ is preferably detachably fixed to the adjacent closing plate 2ᵈ' by a screw 3ᶜ, or other suitable device as shown in Fig. 2. The cap is provided with an annular bearing surface which is snugly engaged by the inner end edges of the core box sections 3ª, 3ª. The opposite side edges of the sections 3ª, 3ª, are suitably finished to fit closely together when assembled in the support 2ᵈ. The outer end edges of the sections 3ª, 3ª, are provided with flanges 3ᵈ which fit within the recess 2ᵉ in the wall of the support 2ᵈ. At 3ᵉ' each flange is cut away to receive the stop 2ᵉ', the engagement with which determines the angular position of the core box sections 3ª, 3ª, within the support or member 2ᵈ.

The inner end of each core box section 3ª is provided with a flange or rib 3ᶠ which forms the seat member to engage with the wall of the member 2ᵈ, whereby the section may properly fit therewithin. It will be understood that the seat members 3ᶠ and 3ᵉ vary in width according to the internal size of the core box 3, so that each section 3ª thereof may be properly positioned to cooperate with the other section 3ª, constituting the core box 3 to form a core of the desired size.

In actual practice, the core box frame 2ª is provided with one or more receiving members 2ᵈ, each adapted to receive a core box 3 which is capable of forming a core for the largest sized piston or other device which the structure 2 may at any time be called upon to make. By this construction I am enabled to insert in the receiving members 2ᵈ core boxes 3 of varying internal sizes to form cores of any desired diameter and shape within the capacity of the structure. In the core box frame 2ª herein illustrated I have adapted my invention to the making of four cores simultaneously. It will be understood, in this connection, that such frame may be arranged to form a greater or less number of cores. Furthermore, since each core box 3 is insertible and removable independently of the remaining core boxes, I am enabled to form a plurality of cores of similar size or to make them of different sizes.

4 indicates a suitably shaped pattern, preferably fixed to the frame plate 2ᶜ, to form a central metal receiving basin 4' with gates 4ª leading radially therefrom, at either side of each core at its base, and disposed between the cores, as will be readily understood by those skilled in the art to which my invention relates.

The core box frame 2ª is arranged in horizontal position with the desired sized core boxes 3 positioned in the receiving members 2ᵈ thereof. The drag 2ᵇ is mounted on the frame 2ª, the pins 2ᵉˣ on the plate 2ᶜ fitting the openings formed in lugs 2ᵇ' on the drag 2ᵇ, thus causing the drag to be properly positioned.

Next, green sand, suitably tempered and conditioned, is placed in the core boxes and drag and tamped in any well known manner, after which the sand is leveled and a board or plate 5 placed over and secured to the drag 2ᵇ by a suitable clamping member 2ᵉ''. The board or plate 5 may be formed with openings 5' through each of which a vent forming pin may be inserted to form a vent A in the core. (See Fig. 9). The core box structure 2 is then inverted and the carrier 1ᵈ elevated until it engages the plate or board 5. Upon the release of the clamp member 3ᶜ'', the carrier is allowed to drop or move downwardly, the board 5, drag 2ᵇ, and core box sections 3ª, with the cores formed within them, moving downwardly with the carrier 1ᵈ under the influence of gravity.

Next, the core box sections 3ª of each core box are disengaged from the core which they surround by movement laterally away from each other, as by the hands of the molder or in any other suitable manner. In such operation, both sections 3ª are preferably moved substantially simultaneously in opposite directions, radially of the axis of the core. If desired, the drag 2ᵇ and core boxes 3 with the cores may be transported from the carrier to an auxiliary support or table where the core box sections can be readily removed. If desired such support or table may be suitably vibrated in any well known manner to facilitate withdrawal of the core box sections. The drag 2ᵇ carrying the cores may then be placed in position to have the cope of the flask fastened to it preparatory to casting, as will be later described.

The interlocking devices $2^{e'}$ and $3^{e'}$ between the receiving members $2^d$ and core box sections $3^a$ are especially provided to position the core box sections $3^a$ with their meeting edges disposed in a plane which provides maximum space for accessibility to and movement of the sections $3^a$, when they are separated from the core. When the core box structure 2 is arranged to form four cores, the meeting edges of the core box sections $3^a$ are preferably disposed in planes coincident with radial lines passing through the axis of the core box frame $2^a$.

Next, I form the mold section in the flask cope, preferably utilizing a machine in so doing.

11 indicates such a molding machine provided with a rising and falling frame or carrier $11^a$. The machine 11 may be of any preferred or standard form of construction. It is preferably provided with side members or uprights $11^b$, which support a pair of guides $11^c$ for the carrier $11^a$ and upper and lower cross pieces $11^d$, $11^{d'}$. The carrier $11^a$ preferably comprises a base $11^e$ provided with a depending member $11^{e'}$, and a pair of spaced standards $11^f$ each carrying a bracket $11^g$. The base $11^e$ is provided with suitable shoes which engage the guides $11^c$ to guide the carrier in its up and down movements, and the depending member $11^{e'}$ is connected or operated by suitable power mechanism (not shown), preferably of the compressed air type, under control of the valve members indicated at 12. The power mechanism and the valve control members therefor are preferably constructed and arranged to jolt the carrier $11^a$ for tamping the sand, as will be clearly understood by those skilled in the art to which my invention relates, as well as to raise and lower the carrier, for a purpose to be later described.

13 indicates a plate fixed, preferably in a detachable manner, at or along its opposite ends to the brackets $11^g$. The plate 13 is adapted to support in a well known way a suitable pattern or patterns. I have illustrated a plurality of cylindrical patterns $13'$ adapted to make molds for casting engine pistons. The plate 13 is formed at either side with cut away portions $13^a$, the purpose of which will be later described.

14 indicates the flask structure, preferably the cope part thereof, adapted to be placed on or over the pattern. The cope 14 may be of any desired shape and construction. It is detachably secured to the pattern plate 13 by any suitable means 15 during the tamping operation.

The connecting means 15 preferably comprise a pair of upright guide pins $15^a$, supported at either side of the plate 13, apertured lugs $14^a$ projecting from the cope 14 through which the pins extend and wedges $15^b$ which fit elongated slots formed in the pins $15^a$ and engage the adjacent walls of the slots and lugs $14^a$ to hold the cope 14 in position, one pin only being shown.

16 indicates a stripping plate arranged to be interposed between the cope 14 and pattern plate 13. The plate 16 is formed with suitable openings $16^a$, of the proper shape and size to permit it to fit over the patterns $13'$ and in close engagement with the plate 13. At opposite sides, the stripping plate 16 is formed with openings $16^b$ to receive the guide pins $15^a$, whereby the latter serve to aline or position the stripping plate 16 on the pattern plate 13 and to guide the former during the stripping operation. The under surface of the stripping plate 16 is preferably provided with recesses $16^{a'}$ near the corners thereof for a purpose to be later set forth. In the apparatus illustrated, I prefer to provide the stripping plate 16 with gate patterns $16^c$ and a pouring basin pattern $16^d$ which is formed with an opening to receive and support a sprue pin 17.

18 indicates the stripping devices, preferably comprising four members or arms $18^a$ each pivotally mounted on a support $18^b$ fixed to the cross pieces $11^d$. The arms $18^a$ may be connected together whereby they operate about their pivots simultaneously, the arms $18^a$ on either side of the machine being connected by a rod $18^c$ and one arm $18^a$ on one side being connected with the corresponding arm $18^a$ on the opposite side by a link mechanism the intermediate link of which is pivoted on the support $18^b$. The ends of the arms $18^a$ adjacent to their pivots are preferably weighted to slightly counterbalance the weight of their opposite or free ends. This form of construction coöperates with the means, hereinafter described, for moving the arms $18^a$ into operative position and also maintains them in this latter position after they have been moved thereto. $18^e$ indicates stop pins carried by the weighted ends of the arms $18^a$ and arranged to stop the latter at a predetermined point. The pins $18^e$ are preferably screw-threaded in openings formed in the arms $18^a$, whereby they may be readily adjusted to stop the arms $18^a$ at the proper position.

The arms $18^a$ are foldable or collapsible into a horizontal position, as shown in Figs. 10 and 11, below the pattern plate 13. When in this position, the arms $18^a$ permit the stripping plate 16 and cope 14 to be arranged on the pattern plate 13 in convenient position for the operative to work with the carrier $11^a$ in its normal or lowermost position. The arms $18^a$ on one side of the machine are slightly offset relative to the arms $18^a$ on the opposite side thereof in order that they may be arranged side by side upon the support $18^b$, as shown in Figs. 10 and 11.

Upon the operation of the carrier 11ª to its elevated position, the arms 18ª may be swung about their respective pivots into vertical or operative position, and in the path of movement of the stripping plate 16 as it moves downwardly with the carrier 11ª, as the latter returns to normal position. When in operative position, the arms 18ª arrest the downward movement of the stripping plate 16 and cope 14 superposed thereon, but permit the carrier 11ª and plate 13 to continue downwardly to their normal position, the cutaway portions 13ª in the plate 13 allowing the pattern plate 13 to move downward without engagement with the arms 18ª, and the stripping of the mold from the patterns 13'.

The free ends of the arms 18ª are arranged to enter the recesses 16ª' formed in the stripping plate 16, when the plate moves downwardly into engagement therewith. This operation forms a connection between the arms and plate so that the latter cannot be displaced. The plate 16 will therefore be maintained in alined position to receive the guide pins 15ª when, after the removal of the cope 14, the pattern plate 13 is again elevated.

I prefer to provide suitable means 19 for positively operating the arms 18ª from inoperative to operative position during the raising of the carrier 11ª. Of these operating means, 19ª indicates a member preferably fixed to and movable with the carrier 11ª. The member 19ª may consist of an arm fixed to one of the standards 11ᵗ and projecting laterally therefrom into position to engage one of the arms 18ª as the carrier 11ª moves upwardly. The member 19ᵉ operates to swing one of the arms 18ª upwardly far enough and impart sufficient momentum thereto so that it, with the assistance of its weighted end, will swing to the operative position. I prefer to provide two operating arms 19ª, each of which will engage an adjacent stripping arm 18ª.

I will now describe the steps of making a mold in the cope, which, for the purpose of illustration, may be considered to be the next step in my improved process. With the carrier 11ª arranged in normal position, carrying the pattern plate 13 and stripping plate 16, the cope 14 is placed on the stripping plate 16 and secured thereto and to the pattern plate by inserting the wedges 15ᵇ in the slots of the pins 15ª. The sprue pin 17 is also placed in position. This arrangement of the apparatus and cope is shown in Fig. 10. The cope 14 is then filled with green sand, suitably tempered and conditioned, after which the carrier 11ª, by means of a valve control member thereof, is jolted sufficiently to tamp the same. Any surplus sand on the cope 14 may be removed with a proper tool, making it level with the upper edge thereof. The sprue pin 17 is removed and also the wedges 15ᵇ, thus unlocking the cope 14 and stripping plate 16 from each other and also from the plate 13. The proper valve control member for the carrier 11ª is then operated, causing it to rise to its extreme upper position and to then return to normal position. During upward movement of the carrier 11ª, the arms 19ª engage with and swing the stripping devices 18ª upwardly and outwardly into vertical position, then as the carrier 11ª returns to normal position the stripping plate 16 engages with and is arrested by the free ends of the devices 18ª, thus stripping the mold from the pattern 13' (see Fig. 12). The cope 14 is then removed from the stripping plate 16.

To position the parts for making of a new mold, the proper valve control member for the carrier 11ª is again actuated, causing the carrier to move upwardly and downwardly. During its upward movement, the carrier 11ª will engage the stripping plate 16 and lift it off of the arms 18ª, following which the operative may swing the arms 18ª inwardly and downwardly into the inoperative position. With the arms 18ª in inoperative position, the stripping plate 16 will move downwardly with the carrier 11ª, as it returns to normal position, ready to receive a cope 14.

During the making of the mold section in the cope the gate patterns 16ᶜ form the gates 16ᶜ' in the sand, each of which leads between and communicates at either end with the adjacent mold cavity, the sprue pin 17 forms the necessary sprue hole 17" and the basin pattern 16ᵈ forms the upper part 16ᵈ' of the pouring basin.

Next, I place the cope upon the drag as shown in Figs. 15 and 16. The frames of these parts may be provided with removable interlocking or registering devices which will insure that the parts always go together in exactly the same way and that each core on the drag will be concentric with one of the mold recesses in the cope. At the time of thus assembling the cope and drag each radially disposed gateway 4ª in the drag at its outer end will communicate with one of the curvilinear gateways 16ᶜ' in the cope, each of which curvilinear gateways preferably extends between two mold cavities.

The complete mold is now in readiness for casting. The molten metal is poured into the sprue opening at the top of the cope in the well known manner and descends through the sprue passageway to the centrally disposed pouring basin 4' from which latter it flows radially outwardly in the radially disposed gateways 4ª and thence from the end of each gateway laterally in both directions in the gateway 16ᶜ' communicating therewith, to the adjacent mold cavities, molten metal entering each mold cavity at the opposite sides thereof at the bottom and then rising in the mold cavity, expelling air, gas and etc. through the sand and vents until the complete casting is formed.

This application embraces divisional subject-matter of my application Serial No. 816,461, filed February 4, 1914.

No claim is made herein to disclosed subjects-matter relating to the machine for making molds and the means for stripping molds from the pattern or patterns, the invention therein being claimed by me in my application for Letters Patent filed Feb. 4, 1914, Ser. No. 816,460.

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting.

What I claim is:

1. The herein described process which consists in assembling a plurality of core box sections and a gate and pouring basin pattern upon a support to form a core upside down with an adjacent pouring basin and a gate at one side of said core, positioning a drag at the open end of said core box, then filling said core box and drag with sand and tamping it to form an integral mass of sand in said drag and core box, then separating said drag and core box with the sand therein from the support, then separating the sections of the core box from the core formed therein, forming in sand in a cope a recess to receive said core and to constitute therewith a mold for a cup-shaped article having a gate leading laterally from its open end, then placing the cope and drag together with the core inside the mold cavity in the cope, the gate in the drag communicating at its outer end with the gate in the cope.

2. The herein described process which consists in assembling a plurality of sectional core boxes and a gate and pouring basin pattern upon a support to form a plurality of cores upside down with a centrally disposed pouring basin and gates extending radially at each side of each core, then positioning a drag at the open end of said core boxes, then filling said core boxes and drag with sand and tamping it to form an integral mass of sand in said drag and core boxes, then separating said drag and core boxes with the sand therein from the support, then separating the sections of each core box from the core formed therein, forming in sand in a cope recesses to receive said cores and to constitute therewith molds for cup-shaped articles, with gates extending laterally between the adjacent walls of adjoining recesses, and then placing the cope and drag together with each core inside one of said recesses in the cope, the gates in the drag communicating at their outer ends with the gates in the cope.

3. The herein described process which consists in forming of a mass of sand a bed and an integral core for a cup-shaped mold, a pouring basin and a gate extending from pouring basin to one side of said core, said pouring basin to one side of said core, forming in sand a mold cavity to receive said core, a gate extending from one side of said mold cavity and a sprue hole disposed to coöperate with said pouring basin, and then assembling the bed and mold containing said mold cavity so that the core will be concentric within the cavity and the gate at one side of the core will communicate at its outer end with the gate leading from the mold cavity.

4. The herein described process of making cup shaped molds which consists in forming of a mass of sand a bed and a plurality of cores integral therewith, a pouring basin common to the cores and gates extending from said pouring basin to either side of each core, forming in sand mold cavities to receive said cores, gates extending from opposite sides of said mold cavities and a sprue hole to coöperate with said pouring basin, and finally assembling said mold sections with each core concentric within one of said mold cavities and the gates at either side of each core communicating with the gates leading from the adjacent mold cavities.

5. The herein described process of making a plurality of piston molds from green sand which consists in assembling together in a support a plurality of sets of correlated core box sections and a drag, to form cores, then filling the core boxes and drag with green sand and tamping it to form a series of cores from one mass of sand, then separating the drag and sand therein, the formed cores and core boxes from the support, then separating the sections of each core box from the formed core therein and from each other, then forming from green sand a mold section having recesses for said cores and then assembling the cores and mold section together to form a mold.

6. The herein disclosed process which consists in assembling together on a support a plurality of segmental sections to form a core box, positioning a drag at the open end of the core box, then filling the core box and drag with sand and tamping it, then separating the drag and sand therein, formed core and core box from the support, and finally moving the segmental sections laterally away from the axis of the core to separate said segmental sections from the core and from each other.

7. The herein disclosed process which consists in assembling together on a support a plurality of sets of segmental sections to form a plurality of core boxes, positioning a drag at the open end of said core boxes, then filling the core boxes and drag with sand and tamping it, then separating the drag and sand therein, formed cores and core boxes from the support, then moving in a lateral direction away from the axis of each core the segmental sections of the adjacent core box to separate them from the core and from each other, forming in sand in a cope a mold formed with a plurality of mold cavities having their axes arranged relative to and spaced from each other similar to the arrangement of and distance between the axes of the cores, and finally positioning said cope upon said drag with each core in and concentric to the wall of one of said mold cavities in said cope.

8. The herein disclosed process which consists in assembling in a support correlated sections of a core box to form a core and placing a drag on the support, then filling the core box and drag with sand and tamping it, then moving the drag and sand therein, the formed core and core box in a direction axially of the core to separate them from the support, and finally moving the sections of the core box from each other in a direction radially of the core to separate them from the formed core.

9. The herein described process which consists in assembling a plurality of core box sections on a support to form a core upside down, supporting a drag at the open end of said core box, then filling said core box and drag with sand and tamping it to form an integral mass of sand in said drag and core box, then inverting and causing said drag with sand therein and formed core and core box under the action of gravity to move away from said core box support, and finally by radial movement thereof separating the core box sections from the formed core and from each other.

10. The herein described process which consists in assembling a plurality of core box sections on a support to form a core upside down, supporting a drag at the open end of said core box, then filling said core box and drag with sand and tamping it to form an integral mass of sand in said drag and core box, then inverting said drag and support and separating said drag, sand therein and formed core and core box from said core box support, and finally by radial movement thereof separating the core box sections from the formed core and from each other.

11. The herein disclosed process which consists in assembling in a support sets of core box sections in spaced relationship about the axis of said support with the abutting edges of the sections disposed in planes radiating from said axis and placing a drag on the support, then filling the core box and drag with sand and tamping it, then moving the drag and sand therein, the formed cores and core boxes along said axis to separate them from the support, and finally moving the sections of each core box at right angles to the plane of their abutting edges to separate the sections from the core and from each other.

12. The herein described process of making from green sand molds for cup-shaped articles, it consisting in assembling on a support a plurality of core box sections to form a core upside down, positioning a drag at the open end of said core box, filling the core box and drag with green sand and tamping the same to form an integral mass, then inverting said core box support and removing said core box and drag with sand therein from said core box support, then separating the core box sections from the core within by moving them radially relative to the axis of said core, forming in green sand in a cope, which forms with said drag a flask, a mold cavity to receive said core, and finally positioning said cope upon said drag with said core concentric within said mold cavity.

13. The herein described process of making green sand molds for cup-shaped articles, it consisting in assembling on a support a plurality of sectional core boxes, to form a plurality of cores upside down, and a pattern to form a pouring basin common to said cores and gates leading therefrom between the cores, positioning a drag at the open end of said core boxes, filling the core boxes and drag with green sand and tamping the same to form an integral mass, then inverting the core box support and removing said core boxes and drag with sand therein from said support, then separating the sections of each core box from the core within by moving them radially relative to the axis of said core, forming in green sand in a cope, which forms with said drag a flask, a plurality of mold cavities, each adapted to receive one of said cores, and a sprue hole having at its lower end a port adapted to register with said pouring basin in the drag and gates leading from said mold cavities and disposed to communicate with said gates in the core, and finally positioning said cope upon said drag with each said core concentric with one of said mold cavities.

14. The herein described process which consists in assembling on a support in correlated relationship a sectional core box and a drag, then filling the drag and core box with sand to form in one integral mass a bed and a core, then moving as a unit from the support the drag and core box with the bed and core therein, and finally laterally moving the core box sections from each other.

15. The herein described process which consists in assembling on a support in correlated relationship a sectional core box and a drag, then filling the drag and core box with sand to form in one integral mass a bed and a core, then moving axially of the core as a unit from the support the drag and core box with the bed and core therein, and finally laterally moving the core box sections from each other.

16. The herein described process of making cup-shaped articles having internal projections, which consists in assembling on a support in correlated relationship a suitably shaped sectional core box and a drag, then filling the drag and core box with sand and tamping it to form in one integral mass a bed and a core, then separating from the support by movement in a direction axially of the core as a unit the drag and core box with the bed and core therein, and finally separating the core box sections from each other by movements in a radial direction.

In testimony whereof I affix my signature.

DANIEL J. RYAN.